United States Patent [19]

Burkes, Jr. et al.

[11] 4,444,006

[45] Apr. 24, 1984

[54] NOZZLE/VALVE DEVICE FOR A DUCTED ROCKET MOTOR

[75] Inventors: William M. Burkes, Jr.; William H. Miller, both of McGregor, Tex.

[73] Assignee: Hercules Incorporated, Wilmington, Del.

[21] Appl. No.: 231,633

[22] Filed: Feb. 4, 1981

[51] Int. Cl.³ .............................................. F02K 9/56
[52] U.S. Cl. ...................... 60/251; 137/375; 137/625.18
[58] Field of Search .............. 60/245, 253, 270 R, 60/270 S, 271, 251; 137/625.18, 375

[56] References Cited

U.S. PATENT DOCUMENTS

| | | | |
|---|---|---|---|
| 2,968,919 | 1/1961 | Hughes et al. | 60/35.6 |
| 3,192,709 | 7/1965 | Hardy | 60/35.6 |
| 3,555,826 | 1/1971 | Bennett, Jr. | 60/270 S |
| 3,760,589 | 9/1973 | Puckett et al. | 60/253 |
| 3,786,993 | 1/1974 | Burgess et al. | 239/265.19 |
| 3,907,222 | 9/1975 | McComas | 244/74 |
| 3,914,935 | 10/1975 | Burkes, Jr. | 60/225 |
| 3,970,253 | 7/1976 | Burkes et al. | 239/265.19 |
| 4,079,747 | 1/1978 | Roberts | 137/375 |
| 4,102,498 | 7/1978 | Cherry | 239/265.19 |
| 4,258,786 | 1/1981 | Lochte et al. | 137/625.18 |
| 4,338,963 | 7/1982 | Frame | 137/375 |
| 4,355,663 | 10/1982 | Burkes, Jr. et al. | 60/253 |

*Primary Examiner*—Carlton R. Croyle
*Assistant Examiner*—Jeffrey A. Simenauer
*Attorney, Agent, or Firm*—J. E. Crowe

[57] ABSTRACT

A nozzle/valve device for a ducted rocket motor is provided. The nozzle/valve device employs a design in which a nozzle throat blockage element can be moved by translational motion within the nozzle throat section of the device. The blockage element is designed so that in the closed position the nozzle throat has a minimum cross-sectional flow area and therefore the nozzle throat is never fully closed. The seals employed in the nozzle/valve device are isolated from contact with reaction products of the gas generator and effective use of minimum amounts of erosion resistant materials is achieved.

9 Claims, 4 Drawing Figures

NOZZLE/VALVE DEVICE FOR A DUCTED ROCKET MOTOR

SUMMARY OF THE INVENTION

This invention relates to a nozzle/valve comprising a throat area change device employing a guillotine rod designed for forming a variable choke area in a nozzle throat which provides a flow channel between a fuel rich solid propellant gas generator and a secondary combustion chamber in a ducted rocket motor.

BACKGROUND OF THE INVENTION

Fixed-fuel-flow ducted rockets suffer performance degradation when operated at altitudes and fuel-grain soak temperatures substantially different from baseline design conditions. System performance studies for ducted rockets indicate significant improvements are possible if fuel-rich generant flow rate can be controlled so as to approach a near-optimum air-to-fuel ratio for each particular flight and environmental condition.

OBJECTS OF THE INVENTION

It is an object of the present invention to provide a nozzle/valve for a ducted rocket motor which will enable significant improvement in system performance.

The other objects, features, and advantages of the present invention are pointed out with particularly in the claims annexed to this specification. Further, they will become more apparent in light of the following detailed description of the preferred embodiment thereof and as illustrated in the accompanying drawings.

In accordance with the present invention, a nozzle/valve provides a variable choke area in the nozzle through which fuel-rich generant from a solid propellant gas generator flows into a secondary combustion chamber of a ducted rocket. The nozzle/valve is movable from a fully open position to a closed position. In the closed position the choke area of the nozzle is reduced to a predetermined minimum area but the nozzle throat is never completely closed. This is accomplished by having the movable throat blockage element bottom out at the end of its stroke. Elimination of the possibility of total closure of the nozzle throat eliminates one cause of catastrophic over-pressurization of a gas generator in a ducted rocket motor. The unique design of the nozzle/valve of this invention permits use of erosion resistant and thermal shock resistant materials at locations which enable minimum quantities of such materials to be effective. The nozzle/valve of this invention employs seals which are removed a substantial distance from the hot flowing gas passing through the nozzle/valve such that the seals remain effective during the life of the unit.

In a preferred embodiment, there is provided a nozzle/valve for controlling the flow of combustion products from a fuel generator to a secondary combustion chamber of a ducted rocket motor, said nozzle/valve comprising a valve body having a stem section and a flow section intersecting and attached to said stem section, said stem section comprising an outer stem member and a stem insulator for said outer stem member housed within said outer stem and extending throughout the length of the outer stem member, said stem insulator having a central longitudinal stem cavity extending throughout the length of the stem insulator and a plurality of openings extending through the side wall of said stem insulator, a flow section comprising an outer flow member and a flow insulator for said outer flow member housed within and extending throughout the length of the outer flow member, said flow insulator having side walls and a central longitudinal cavity extending throughout the length of the flow insulator, the central longitudinal cavity in said flow insulator defining a flow channel through said flow section, and a plurality of openings extending through the side wall of said flow insulator which openings are in registration with the openings in the side wall of the stem insulator, a guillotine rod having a hole through the body thereof, said guillotine rod housed within the stem insulator and having its outer surface contiguous with the interior surface of the stem insulator which is defined by the central longitudinal stem cavity in the stem insulator, a first portion of the body of the guillotine rod forming the flow blockage element for the flow channel, a stem closure in locking engagement with said stem section, first seal means for sealing between the stem closure and the stem section, second seal means for sealing between the stem insulator and the guillotine rod, and actuator means for imparting translational movement to the guillotine rod to move said guillotine rod between a closed position in which the body of said guillotine rod partially blocks the flow channel and an open position in which the hole through the body of the guillotine rod is aligned with the flow channel.

DETAILED DESCRIPTION OF THE PREFERRED EMBODIMENT

This application is related to our U.S. Pat. No. 4,355,663, filed Mar. 11, 1980. The nozzle/valve of the present invention is intended for use in similar environments as the nozzle/valve disclosed therein. The disclosure of that application, particularly with respect to alternative environments, is hereby incorporated by reference.

Figure 1:
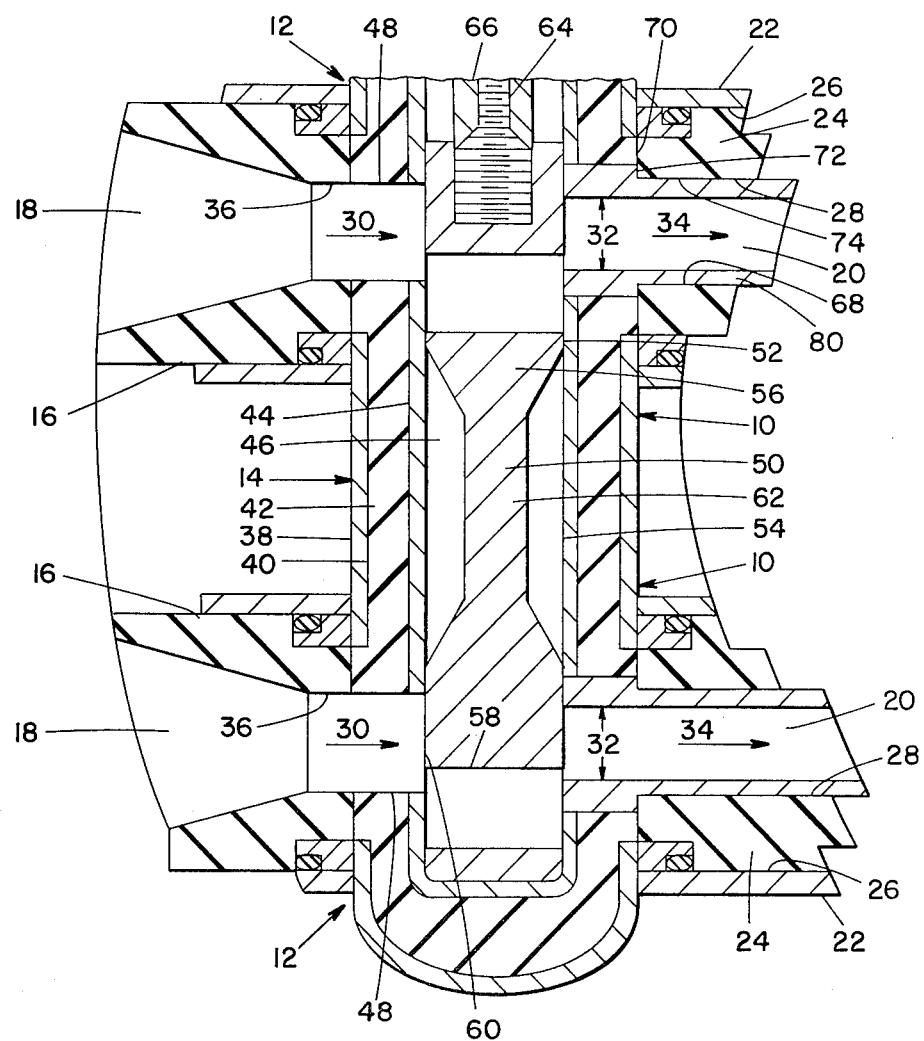
FIG. 1 is a cross-sectional side view of an embodiment of the present invention employing twin nozzle/valves.

In FIG. 1 a dual manifold system employing twin nozzle/valves of this invention is illustrated although any number of single or multiple nozzle/valves of this invention may be used in a particular environment. Each nozzle/valve (10) comprises a valve body (12) having a stem section (14) and a flow section (16). In the illustrated embodiment, flow section (16) and stem section (14) are tubular members which are in communication with each other and intersect each other at right angles. The flow section (16) has opposing flow ports

(18) and (20), either of which may be the inlet or the outlet for gas flow, depending on the orientation of the nozzle/valve (10) in the gas flow path in which the valve is mounted.

With continued reference to FIG. 1, the flow section (16) comprises a tubular outer flow member (22) containing a tubular flow insulator (24) which is contiguous with the inner surface (26) of the outer flow member (22). The side walls (28) of the flow insulator (24) define a central longitudinal cavity (30) of circular cross-section (32), extending throughout the length of the flow insulator (24). This central longitudinal cavity (30) formed by the tubular side walls (28) of the flow insulator (24) defines a flow channel (34) through the flow section (16), as is seen in FIG. 1. Flow insulator (24) also has a plurality of openings (36) extending through the side walls (28) of said flow insulator (24). These openings (36), (30) and (34) are located at right angles to and intersect longitudinal stem cavity (46).

Still with reference to FIG. 1, stem section (14) is contiguous to and positioned along the length of flow section (16) so as to communicate directly with the openings (36) in the flow insulator (24) and the outer flow member (22). Stem section (14) comprises an outer stem member (38) which is tubular in the illustrated embodiment. Interior to the outer stem member (38) and contiguous to the inner surface (40) thereof, is stem insulator (42) which is also tubular. The side walls (44) of the stem insulator (42) define a central longitudinal stem cavity (46). Both the outer stem member (38) and the stem insulator (42) are provided with openings (48) and it is intended that these openings (48) in the outer stem member (38) and the stem insulator (42) will be in registration with the openings (36) in the side wall (28) of the flow insulator (24). In this manner, the central longitudinal stem cavity (46) formed by the side wall (44) of the stem insulator (42) and the central longitudinal cavity (30) formed by the side walls (28) of the flow insulator (24) will be in direct registration and will intersect at right angles.

As shown in FIG. 1, guillotine rod (50) is housed within the stem section (14) and passes through the central longitudinal stem cavity (46) formed by the side walls (44) of the stem insulator (42). The guillotine rod (50) is of generally cylindrical shape having its outer surface (52) contiguous with the interior surface (54) of the stem insulator (42) and represents a solid body (56) with two holes (58) therethrough. Most advantageously, the guillotine rod (50) is constructed of three portions: a flow blockage element (60) formed by that portion of the body (56) in the area of the hole (58), a heat insulator portion (62) and a guillotine rod connecting portion (64). The guillotine rod (50) may be constructed using different materials for each such portion, or the same material may be used throughout. In the illustrated embodiment employing two of the nozzle/valves of the present invention, a single guillotine rod (50) may have more than one section corresponding to each of these portions. Guillotine rod (50) is operated by translational movement between a fully closed position as illustrated in FIG. 1 and a fully open position (not shown) in which the hole (58) in the body (56) of the guillotine rod (50) is aligned with the centerline of the flow channel (34). Guillotine rod (50) is moved by activation means (66), more fully described hereinafter.

In the nozzle/valve shown in FIG. 1, flow insulator (24) has an axial cylindrical cavity (68) on one side of the guillotine rod (50) which bridges the intersection (70) of the stem section (14) and the flow section (16) on that side. As seen in FIG. 1, the axial cavity (68) is defined by annular shoulder (72) and side wall (74).

Still with reference to FIG. 1, cylindrical insert (80) is prepared from an erosion resistant material, preferably titanium-zirconium-molybdenum alloy, and is sized to correspond in size to axial cylindrical cavity (68) and is placed therein. When the cylindrical insert (80) is thus inserted, the interior surface formed by flow insulator (24) and cylindrical insert (80) is smooth and substantially continuous except for openings (36) in the side wall (28) of the flow insulator (24). As previously stated, these openings (36) are perpendicular to central longitudinal stem cavity (46) housing the guillotine rod (50).

Figure 2:
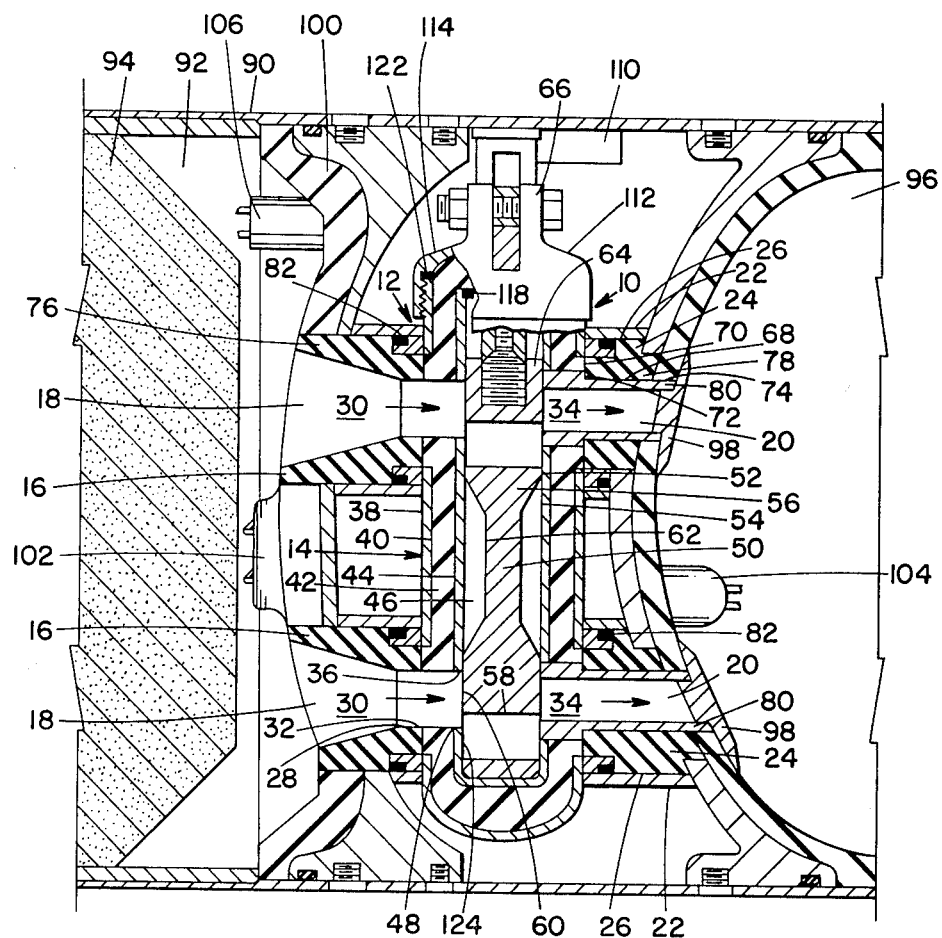
FIG. 2 is a side view of a ducted rocket, partially broken away and partially in cross-section, illustrating the position of the nozzle/valve of this invention with respect to the forward end of the ducted rocket containing the fuel-rich solid propellant grain and the aft end of the ducted rocket containing the secondary combustion chamber which can also be used as a booster propellant rocket chamber.

The nozzle/valve of this invention can be installed in a ducted rocket motor as shown in FIG. 2 in which the nozzle/valve (10) is connected to throat sections (76) and (78) which are secured by some type of clamping means and suitably sealed, as by the use of metal C-rings or elastomeric O-rings, shown as (82) in FIG. 2. Other means for connecting and sealing of the nozzle/valve of this invention in a ducted rocket motor can be employed.

It should be apparent that flow insulator (24) or stem insulator (42) may be formed of more than one piece so long as any individual pieces fit together to form a substantially continuous insulating surface.

FIG. 2 further illustrates the position of the nozzle/valve (10) of the present invention housed in a ducted rocket motor (90) in relation to the forward chamber (92), the fuel-rich gas generator charge (94) housed within a forward chamber (92) within the ducted rocket motor (90) and the secondary combustion chamber (96). A blow-out plug (98) is used to close flow channel (34) to prevent combustion gases from passing from secondary combustion chamber (96) through flow channel (34) into forward chamber (92). Combustion gases result upon ignition of solid propellant (not shown) which forms the boost stage of the ducted rocket motor (90) and which, upon completion of burning, leaves a cavity which becomes the secondary combustion chamber (96). Flow of such gases through flow channel (34) could ignite the fuel-rich gas generator charge (94) out of proper sequence, in operation of a ducted rocket motor (90). However, in some applications, this initial ignition of the fuel-rich gas generator charge (94) is acceptable.

FIG. 2 shows the interstage (100) between the forward chamber (92) and the secondary combustion chamber (96) of the ducted rocket motor (90). In addition to the nozzle/valve (10) of the present invention, several other components are advantageously housed within the interstage (100) of the ducted rocket motor (90). These components may include a safe/arm-igniter device (104) for the booster propellant (not shown), a safe/arm-igniter device (102) for the fuel-rich gas generator charge (94), a pressure transducer (106) for measuring pressure within forward chamber (92) and a linear potentiometer (110) for measuring movement of the guillotine rod (50).

Figure 3:
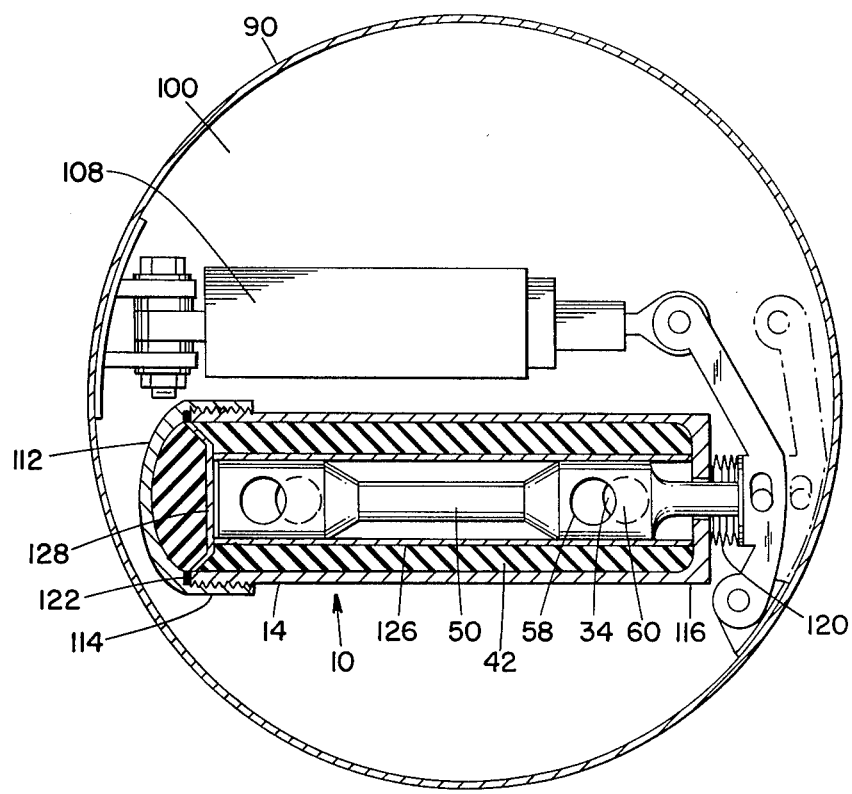
FIG. 3 is a partially broken-away cross-sectional view of an alternative embodiment.

In a dual manifold system, as illustrated in FIG. 3, an actuator device (108) is positioned alongside the twin nozzle/valve (10) in the interstage (100). This actuator device (108) simultaneously moves the guillotine rod (50) in each nozzle/valve (10). The actuator device (108) operates in response to an electrical signal as follows. Upon receipt of a signal generated in response to action of the ducted rocket missile, the guillotine rod (50) is moved in response to the signal, dependent upon how the missile is programmed or commanded to function. Movement of the hole portion (58) of guillotine rod (50) into line with the flow channel (34) removes the flow blockage element (60) from the cross-sectional area of the flow channel (34). Also, in response to a signal, the flow blockage element (60) can be moved into the flow channel (34), reducing the flow area through the nozzle/valve (10).

As shown in FIG. 2, stem section 14 is further provided with a stem closure (112). This might be provided by threaded cap (114) or other suitable closure providing locking engagement. Actuator means (66) of the guillotine rod (50) may pass through the stem closure (112) as illustrated in FIG. 2. In this construction it is necessary to provide sealing means between the stem closure and the actuator means (66) of the guillotine rod (50). Alternatively, the actuator means (66) of the guillotine rod (50) may pass through the closed end (116) of the stem section (14) as illustrated in the alternative embodiment shown in FIG. 3. In this construction it is necessary to provide sealing means between the actuator means (66) of the guillotine rod (50) and the closed end (116) of the stem section (14).

One type sealing means which might be employed would be internal such as the elastomeric O-ring shown as (118) in FIG. 2 which may be used if the position is sufficiently insulated. Another means of sealing would be external, such as the metal bellows shown as (120) in FIG. 3. Sealing means, such as the elastomeric O-ring seals (122) are also advantageously used at the junction of the stem section (14) and the stem closure (112).

It may also be advantageous to provide a thin layer of erosion resistant material covering the stem insulator (42). Such a layer may be provided as a tubular insert, shown as (124) in FIG. 2, or as a thin cylinder and disk, shown as (126) and (128) respectively in FIG. 3.

Figure 4:
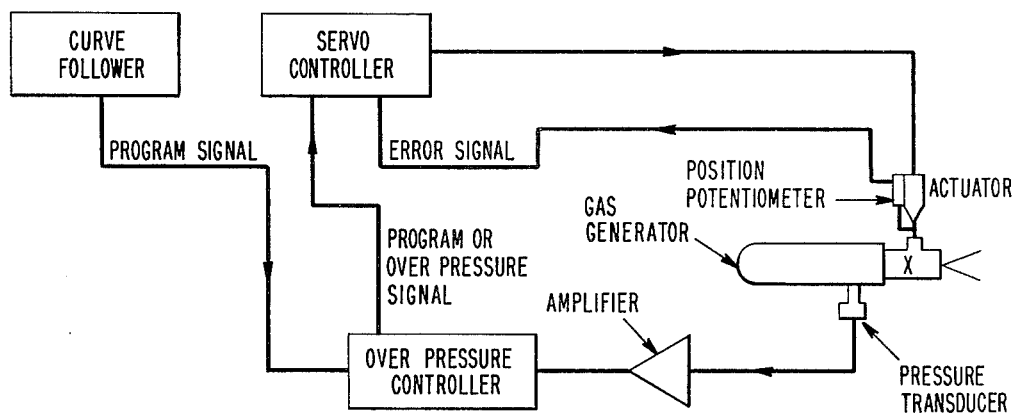
FIG. 4 is a diagram of a pre-programmed control loop used for controlling the opening and closing of the nozzle/valve of this invention according to a pre-programmed schedule.

FIG. 4 illustrates a typical control loop for pre-programming the operation of a nozzle/valve of the present invention. As illustrated, a pressure transducer (106) senses the pressure in the forward chamber (92) and sends an electrical signal based on the pressure sensed to an amplifier. The amplified signal is transmitted to a pressure controller wherein the pressure is compared with a signal emitted by a curve follower which is pre-programmed and which is activated on firing of the ducted rocket motor (90). If the electrical signals received by the controller are different, the pressure controller emits a signal to the sensor controller which in turn actuates the actuator device to open or close the nozzle/valve (10) as necessary to bring the pressure in the forward chamber (92) into agreement with the pre-programmed pressure. Control systems other than the system described above can be employed in the operation of the nozzle/valve (10) of the present invention.

The nozzle/valve of this invention provides a fully variable, multicycle, reversible nozzle in which the nozzle throat area can be varied. The nozzle/valve can be actuated by any suitable means such as electromechanical, pneumatic or hydraulic actuators with feedback control. The nozzle/valve of this invention can be housed in a ducted rocket motor within a forward gas generator chamber, within the secondary combustion chamber or in an interstage between said chambers which has been illustrated in the drawings. The interstage installation is the preferred position for installation of the nozzle/valve of this invention to provide isolation of the nozzle/valve components from the combustion environment of the ducted rocket.

The nozzle/valve of this invention employs translational motion of a guillotine rod to control gas flow. The design of the nozzle/valve of this invention enables isolation of seals, bearings and the actuation device from direct contact with hot combustion gases and provides a design enabling minimum quantities of erosion resistant materials to be employed effectively at critical points within the nozzle/valve. Isolation and thermal protection of many components achieved by the nozzle/valve of this invention results in improved and reproducible performance for a controllable variable fuel flow ducted rocket motor.

Choice of materials is important in construction of the nozzle/valve of this invention. The throat blockage element described herein as the flow blockage element (80) portion of the guillotine rod (50) and the cylindrical insert (80) which defines, in part, the flow channel (34) for hot fuel-rich products flowing from the forward gas generator chamber (92) to the secondary combustion chamber (96) must be erosion resistant and have high temperature strength and low thermal expansion. Materials found preferable for use as throat blockage elements at temperature/pressure environments of about 2000° F. and 2000 p.s.i. were an alloy of titanium, zirconium and molybdenum (TZM), a tungsten-rhenium alloy (W-25RE) and a tantalum-tungsten alloy (TA-10W).

The flow insulator (24) and housing insulator (42) employed in the nozzle/valve (10) of this invention are preferably prepared from silica-phenolic materials. High pressure molded silica-phenolic materials are available commercially from Fiberite Corporation, Winona, Minn. A particularly suitable silica-phenolic insulator is prepared from MX-2646 molding compound by Fiberite Corporation. Carbon-phenolic molded insulators can also be employed. Carbon-phenolic insulators are also available from Fiberite Corporation.

Of the various types of devices that can be employed as the actuator device (108) for the nozzle/valve (10) of this invention, electromechanical devices are preferred. Suitable devices are available commercially from Avionic Products Company, Denville, N.J.; Plessey Dynamics Division, Hillside, N.J.; and Motion Controls Division, Cedar Knolls, N.J.

Seals which can be employed in the nozzle/valve of this invention must be selected from materials suitable for use under the temperature conditions encountered in operation of the ducted rocket motor (90) in which the nozzle/valve (10) of this invention is employed. Elastomeric O-rings can be employed in isolated points, such as the junction seals (80), and these may be made from materials such as ethylene-propylene terpolymer or silicone rubber. However, it is advantageous that all seals subjected to high temperature/pressure environments be prepared from solid copper gaskets, copper crush gaskets or metal C-rings made from materials such as Inconal X-750 preferably with silver or nickel plating. Such seals are available commercially from UAP Components, Inc. High pressure welded metal bellows seals which can be employed are available commercially from Sealol, Inc. and from The Metal Bellows Corp.

What we claim and desire to protect by Letters Patent is:

1. A nozzle/valve device for controlling flow of high temperature gases from a fuel generator to a secondary combustion chamber of a ducted rocket motor, said nozzle/valve comprising, in combination, a valve body having a stem section and two flow sections intersecting and attached to the ends of said stem section, said stem section comprising an outer stem member and a stem insulator for said outer stem member housed with said outer stem member and extending throughout the length of the outer stem member, the interior surface of said stem insulator defining a central longitudinal stem cavity extending throughout the length of the stem insulator and containing openings in registration extending transversely through the side walls of said outer stem member and stem insulator;

flow sections respectively comprising a tubular flow insulator contiguous with the upper and lower ends of said stem insulator and defining flow ports in registration with said transversely extended openings in said stem insulator, to form flow channels and transversely intersecting said central longitudinal cavity;

a guillotine rod having two end positioned flow blockage elements joined by a heat insulator portion, said blockage elements being mounted within said central longitudinal stem cavity in slidable contact with the interior surface of said stem insulator and intersecting said flow channels, each flow blockage element having a hole spaced with respect to the other hole to individually complete the definition of said flow channels, said guillotine rod being endwise linked to an actuator device means for positioning the guillotine rod, as desired, within said central longitudinal stem cavity to effect a position in which the spaced holes of said flow blockage elements are in desired registration with the remainder of each flow channel, to provide the desired amount of interference with flow of gases through said flow channels from said generator to said secondary combustion chamber.

2. The nozzle/valve of claim 1 in which the stem insulator comprises two sections prepared from silica-phenolic material which sections in assembly comprise a substantially continuous stem insulator.

3. A nozzle/valve device of claim 1 wherein said actuator device is responsive to pressure sensing means monitoring said fuel generator.

4. The nozzle/valve of claims 1 or 3 in which the first portion of the guillotine rod which defines the flow blockage element is prepared from titanium-zirconium-molybdenum alloy.

5. The nozzle/valve of claims 1 or 3 in which the stem insulator and the flow insulator are prepared from a silica-phenolic composition.

6. The nozzle/valve of claim 3 in which the flow insulator has an axial cavity in the shape of a thin cylinder extending from one end of said flow insulator and bridging the intersection of the stem section and the flow section on one side of the guillotine rod, the interior walls formed by said axial cavity comprising a part of the interior surface of said flow insulator, and an erosion resistant cylinder having a size and shape conforming to said axial cavity, said erosion resistant cylinder being inserted into and filling said axial cavity.

7. A nozzle/valve device of claim 3 wherein said pressure sensing means and said actuator device are externally mounted with respect to the nozzle/valve and said actuator device is an electromechanical, pneumatic or hydraulic actuator.

8. A nozzle/valve device of claim 7 wherein sealing means is utilized to separate said stem closure from the stem section and the stem section from said guillotine rod.

9. A nozzle/valve device of claim 8 wherein a metal bellows seal is utilized to separate the stem section from the guillotine rod.

* * * * *

UNITED STATES PATENT AND TRADEMARK OFFICE
CERTIFICATE OF CORRECTION

PATENT NO. : 4,444,006
DATED : April 24, 1984
INVENTOR(S) : William M. Burkes, Jr. and William H. Miller It is certified that error appears in the above-identified patent and that said Letters Patent are hereby corrected as shown below:

Col. 6, line 18 " (80) portion " should read
-- (60) portion --;

In the Claims, Col. 7, line 16, insert " said "
before -- flow --. (first occurrence).

Signed and Sealed this

Fourth Day of September 1984

[SEAL]

Attest:

GERALD J. MOSSINGHOFF

Attesting Officer  Commissioner of Patents and Trademarks